(12) United States Patent
Hart et al.

(10) Patent No.: US 7,384,589 B2
(45) Date of Patent: Jun. 10, 2008

(54) NANOSCALE MOLECULARLY IMPRINTED POLYMERS AND METHOD THEREOF

(75) Inventors: Bradley R. Hart, Brentwood, CA (US); Chad E. Talley, Brentwood, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 577 days.

(21) Appl. No.: 10/910,505

(22) Filed: Aug. 2, 2004

(65) Prior Publication Data

US 2005/0025440 A1    Feb. 3, 2005

Related U.S. Application Data

(60) Provisional application No. 60/491,955, filed on Aug. 1, 2003.

(51) Int. Cl.
*B29C 35/08* (2006.01)
*C08F 2/00* (2006.01)
*C08F 2/46* (2006.01)

(52) U.S. Cl. .................. 264/494; 264/405; 526/59
(58) Field of Classification Search ............... 264/494, 264/405; 526/59
See application file for complete search history.

(56) References Cited

U.S. PATENT DOCUMENTS

| | | | |
|---|---|---|---|
| 5,110,833 A | | 5/1992 | Mosbach |
| 5,310,648 A | | 5/1994 | Arnold et al. |
| 6,002,471 A | * | 12/1999 | Quake ........................ 356/73 |
| 6,458,599 B1 | | 10/2002 | Huang |
| 6,824,934 B2 | * | 11/2004 | Eldada et al. .................. 430/7 |

OTHER PUBLICATIONS

Malcolm n. Cooke, et al., use of Stereolithography to manufacture Critical-Sized 3D Biodegradable Scaffolds for Bone Ingrowth, 2002, Wiley Periodicals, Inc., J Biomed Mater Res part B: Appl Biomater 64B: 65-69.*

Atomic Force Microscope Specification 6.8.83.1 Rev, 0, 2002, Canadian Light Source, Inc., Saskatoon, Saskatchewan Canada, pp. i-vi, 1-13.*

Automatic Mains Failure, PCM1 Automatic Gen.-set Controller/ AMF Controller, Woodward SEG-Schaltanlagen-Elektronik-Gerate GmbH & co., KG, Krefelder Weg 47-D-47906 Germany, pp. 1-9, 2002.*

Gunter Wulff, Molecular Imprinting in Cross-Linked Materials With The Aid of Molecular Templates-A Way Towards Artificial Antibodies. Angew Chem. Int. Ed. Engl. 1995, 34, 1812-1832.

* cited by examiner

*Primary Examiner*—Mark L. Shibuya
(74) *Attorney, Agent, or Firm*—John H. Lee

(57) ABSTRACT

Nanoscale molecularly imprinted polymers (MIP) having polymer features wherein the size, shape and position are predetermined can be fabricated using an xy piezo stage mounted on an inverted microscope and a laser. Using an AMF controller, a solution containing polymer precursors and a photo initiator are positioned on the xy piezo and hit with a laser beam. The thickness of the polymeric features can be varied from a few nanometers to over a micron.

13 Claims, 7 Drawing Sheets

NANOSCALE MOLECULARLY IMPRINTED POLYMERS AND METHOD THEREOF

CLAIM OF PRIORITY IN PROVISIONAL APPLICATION

This application is related to Provisional Application Ser. No. 60/491,955 filed Aug. 1, 2003 entitled "Nanoscale Molecularly Imprinted Polymers and Method Thereof", and claims priority thereto under 35 U.S.C. 119(e). Provisional Application Ser. No. 60/491,955 is herein incorporated by reference in its entirety.

The United States Government has rights in this invention pursuant to Contract No. W-7405-ENG-48 between the United States Department of Energy and the University of California for the operation of Lawrence Livermore National Laboratory.

BACKGROUND

Molecular imprinting is a process for synthesizing polymeric materials that contain highly specific recognition sites for small molecules. The preparation of molecularly imprinted polymers is a process in which host-guest complexes are produced between a template or target molecule (T) and functional monomers (M). Referring to FIG. 1, these host-guest complexes are then fixed by copolymerization with an excess of cross-linking monomer. The template molecule is then removed from the polymer leaving behind voids within the matrix, which are complementary to the template molecule in size, shape and functional group orientation.

Either covalent and/or non-covalent forces such as hydrogen bonding, electrostatic and hydrophobic interactions enable the organization of functional monomers by the template. In addition, the use of metal coordination complexes as the template for polymer bound functionality has also been investigated.

These Molecularly Imprinted Polymers (MIPs) are to a large degree, thermally and chemical stable and have been shown to retain their recognition properties for several years without loss of selectivity or capacity. As a result, they have advantages over more fragile biological systems for molecular recognition and have been referred to as "plastic antibodies." Under the proper conditions, MIPs have shown the ability to function as selective binding materials capable of enantiomeric separations, micro-reactors, facilitated transport membranes and catalysts. While MIPs have been successful for a variety of applications, little if any regard has been given to surface confinement and miniaturization of these materials. Typically, MIPs are prepared by bulk polymerization that creates a polymer monolith, which is then ground to produce polymer particles. These particles are then used for a variety of applications such as chromatographic stationary phases, selective catalysts or as the recognition elements in chemical sensors.

REFERENCES

Wulff, G.; Kirstein, G. *Angw. Chem. Int. Ed. Eng.* 1990, 29, 684-686

Shea, K. J.; Stoddard, G. J.; Shavelle, D. M.; Wakui, F.; Choate, R. M. *Macromolecules* 1990, 23, 4497-4507.

Hart, B. R.; Rush, D. J.; Shea, K. J. *J. Am. Chem. Soc.* 2000, 122, 460-465

Spivak, d.; Gilmore, M. A.; Shea, K. J. *J. Am. Chem. Soc.* 1997, 119, 4388-4393

Sellergren, B.; Shea, K. J. *J. Chromatogr.* 1993, 654.

Yu, C.; Ramstrom, O.; Mosbach, K. *Anal. Lett.* 1997, 30, 2123-2140.

Hart, B. R.; Shea, K. J. *J. Am. Chem. Soc.* 2001, 123, 2072-2073

Dhal, P. K.; Arnold, F. H. *J. Am. Chem. Soc.* 1991, 113, 7417-7418.

Wulff, g. *Angew. Chem. Int. Ed. Eng.* 1995, 34, 1812-1832.

Haupt, K.; Mosbach, K. *Trends Biotechnol.* 1998, 16, 468-475.

Muller, R.; Andersson, L. I.; Mosbach, K. *Makromol. Chem. Rapid Comm.* 1993, 14, 637-641.

Mathewkrotz, J.; Shea, K. J. *J. Am. Chem. Soc.* 1996, 118, 8154-8155.

Beach, J. V.; Shea, K. J. *J. Am. Chem. Soc.* 1994, 116, 379-380.

Kriz, D.; Ramstrom, L.; Svensson, A.; Mosbach, K. *Anal. Chem.* 1995, 36, 35-38.

Turkewitsch, P.; Wandelt, B.; Darling, G. D.; Powell, W. S. *Anal. Chem.* 1998, 70, 2025-2030.

DETAILED DESCRIPTION

Figure 1:
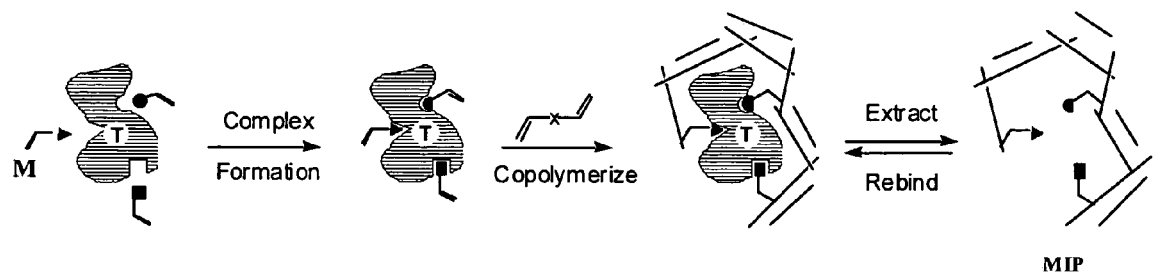
FIG. 1 shows a schematic diagram for the preparation of molecularly imprinted polymers.

The traditional macroscale preparation of MIPs introduces several limitations to their application. The preparation of a uniform distribution of small particle sizes has been a significant challenge since the main method for preparing these particles involves either manual or automated grinding. It has been exceedingly difficult to obtain narrow size distributions for particles less than 50 µm. This has placed a practical limit on the overall scale of MIP based systems and made their use in array type sensing elements impossible.

The synthesis of nanoscale molecularly imprinted polymers (MIPs) can impact applications such as chemical and biological sensing and microscale separations and catalysis. Disclosed herein are advances in the design, synthesis and evaluation of MIPs combined with lasers, microscopy and advanced materials synthesis. An entirely new and versatile route to practical MIP systems is disclosed that represents a significant advance in the preparation of MIPs. The development of techniques that allow the synthesis of nanoscale polymer features with controlled size and shape address many of these limitations. The determination of the appropriate polymerization conditions that allow the synthesis of nanoscale MIPs is discussed as well as the ability to optimize and to vary the size, shape and patterning of the MIP features. The characterization of the resulting polymers is also discussed.

Microfabrication of molecularly imprinted polymers using laser sources for photoinitiation can enable the formation of nanometer scale polymer features. This can be accomplished by using a focused laser source to pattern the polymer features on a surface covered with a solution containing polymerizable monomers, photoinitiator(s) and template molecule(s). This can also be accomplished by using a flow cell to hold a solution of polymerizable monomers, photoinitiator(s) and template molecule(s). Arrays of these features can be prepared on a surface with each polymer imprinted for a different molecule of interest. Thus, the response of the array may reveal a 'fingerprint' indicative of the molecular composition of a particular health threat, for example. Sensor arrays for the determination of DNA have been prepared by making use of the built in selectivity provided by complementary strands. Small molecules such as chemical warfare agents and biomolecules such as peptides and proteins have no comparable natural complement. In many cases, synthetic antibodies have been prepared that demonstrate high selectivity for certain molecules. This has led to the preparation of antibody-based sensors. However, the selectivity of MIPs is quickly approaching that of antibodies. In addition, imprinted polymer based systems have several key advantages over biologically based systems: (1) much greater chemical and thermal stability than biological systems, (2) wide applicability since polymers may be imprinted with almost any analyte of interest, (3) low cost and (4) rapid fabrication.

Moreover, by exploiting the capability of MIPs to function as artificial enzymes, the construction of nanoscale reaction zones are possible, which can be combined with microfluidics and other technologies. The decrease in size can enable the use of a variety of detection schemes that would have been previously incompatible with MIPs. These detection schemes can enhance the sensitivity and lower the detection limits attainable with the MIPs. Moreover, they can make it possible to incorporate the selectivity inherent to MIPs into portable detection units with ultra-sensitive detection. The decrease in size also enables the use of optical detection schemes such as confocal microscopy, which may allow increased sensitivity approaching the single molecule level.

Optimization of polymer formulation, laser initiation, material processing and characterization and system evaluation are all discussed herein. Various methods of characterization such as microscopy (optical, AFM), surface area analysis and IR spectroscopy have provided insight into the process.

Microscope Coverslip

Figure 2:
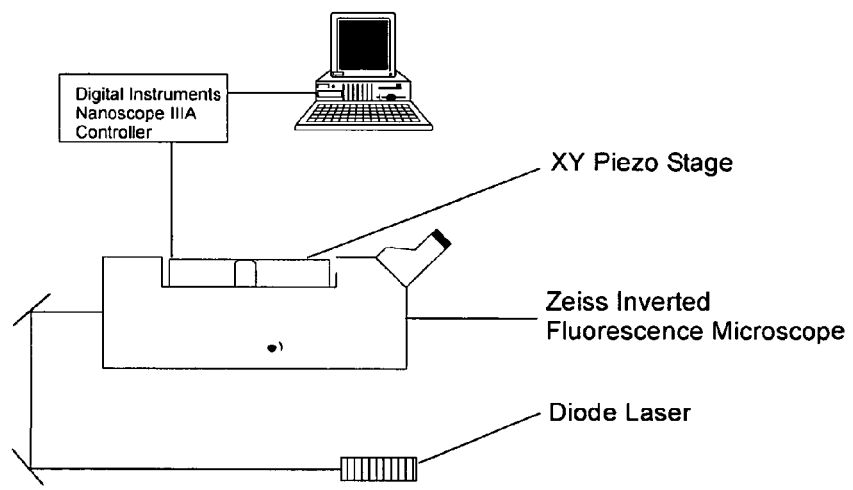
FIG. 2 shows a schematic of the computer controlled microscope/laser system used for nano-scale polymerization of molecularly imprinted polymers.

Experiments have been performed to determine the feasibility of preparing nanoscale polymer features using a 395 nm diode laser as the source for photoinitiation which is centered near the peak absorption for the initiator used for the polymerization. The polymer formulation, made up of ethyleneglycoldimethacrylate (EGDMA) and methacrylic acid (MAA) is typical of many successful imprinted polymers. The polymer formulation includes the free-radical polymerizable monomers Ethyleneglycoldimethacrylate (EGDMA) and Methacrylic acid (MAA) as well as the photoinitiator 4,4'-Bis(dimethylamino)benzophenone. However, any free-radical polymerizable monomers would be compatible with this technique. Additionally, alternative initiators are also available. The experimental set-up consists of an inverted fluorescence microscope equipped with a XY piezo stage. FIG. 2 shows a schematic of the computer controlled microscope/laser system used for nano-scale polymerization of molecularly imprinted polymers. Referring to FIG. 2, the polymerization mixture was placed on a microscope coverslip and mounted onto a xy piezo stage. The position and movement of the stage is controlled by a Digital Instruments Nanoscope IIIA controller. The surface to which the polymer features are to be formed on (glass or quartz microscope coverslips) are placed on the stage. The polymerization formulation is in turn placed on top of the surface. The 395 nm beam from a diode laser is coupled into the back of the microscope and focused to a diffraction-limited spot on the top of the microscope coverslip containing the polymer formulation. This is done with the aid of a 100×oil immersion objective. Polymerization is accomplished by raster scanning the desired area. Feature size and shape is controlled by adjusting the laser power, scan rate and scan area.

Figure 3:
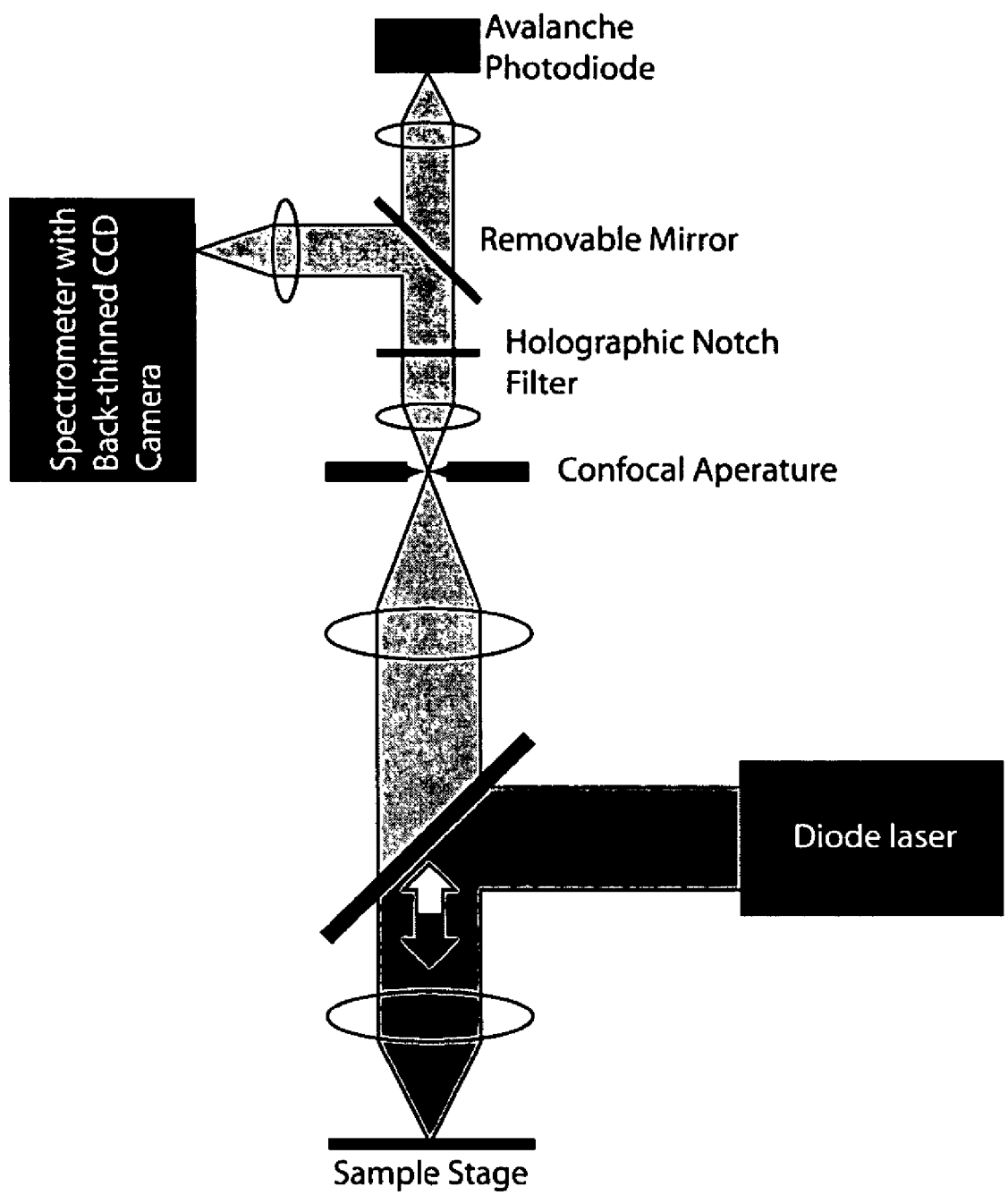
FIG. 3 shows a detailed schematic of the computer controlled microscope/laser system used for nano-scale polymerization of molecularly imprinted polymers.

A more detailed schematic of the system is shown in FIG. 3. The xy piezo stage was mounted on an inverted fluorescence microscope. The 395 nm beam from the diode laser was coupled into the back of the microscope and was focused to a diffraction limited spot on the top of the microscope coverslip containing the polymer formulation with a 100×oil immersion objective. Experiments were performed using a range of laser power settings. Features can be reliably "written" at resolutions approaching 500 nm. The thickness of these polymeric features is directly related to the irradiation time and can be varied from a few nanometers to over a micron.

Simple squares and rectangles have been formed using the microscope software to raster scan the area to be polymerized. Optimization of initiation conditions, has allowed a significant reduction in the size of polymer feature that can be reproducibly formed. Combining simple shapes has allowed the creation of more complex features.

Flow Cell

Control over individual feature size and polymer composition is achieved using a flow cell, which allows introduction of various polymer formulations, washing solutions, inert gases, etc. directly on the substrate while it is mounted on the microscope.

Figure 4:
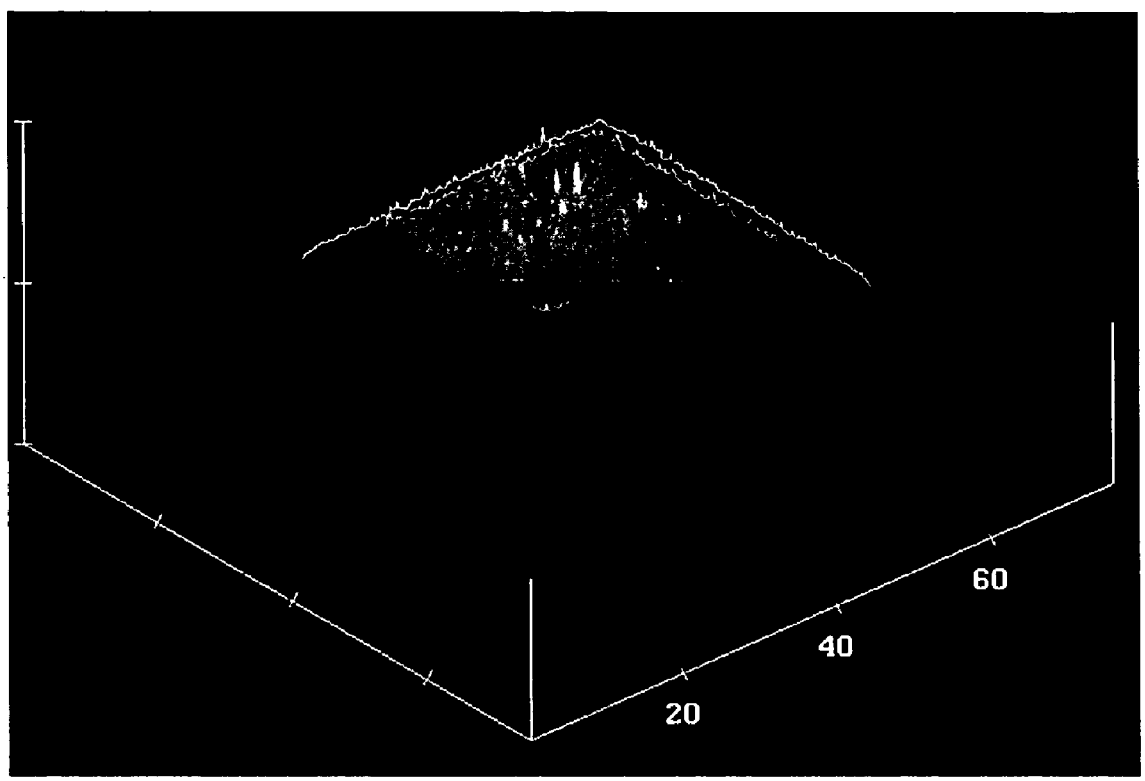
FIG. 4 shows an AFM image of layered laser initiated polymer structures.

A flow cell designed to be compatible with the fabrication system shown in FIG. 2 allows the formation of polymers with differing compositions on the same surface while maintaining control over spatial arrangement. In addition to controlling polymer composition in two dimensions (x & y), the materials can be layered, one on top of the other, to give control of polymer composition (as well as size and shape) in all three dimensions. FIG. 4 shows an AFM image of layered laser initiated polymer structures. Each layer is made using a different polymer formulation.

Control of cross-linked polymer morphology in bulk polymerizations is typically maintained by adjusting the type and amount of solvent, also known as porogen, that is present during the polymerization. This technique is applicable to the system shown in FIG. 2. Polymer features using formulations ranging from 0% to 50 vol % porogen can be prepared without loss of resolution. This is a critical issue due to the effect that porogen has on polymer porosity and surface area. In MIP systems this is the primary technique to tune accessibility of analyte molecules to interior portions of the material where binding can take place. Additionally, non-porous materials that are produced when no porogen is present, have little or no use as selective adsorbents. In molecularly imprinted polymers, lack of porosity also makes removal of template molecules unfeasible, e.g., an inability to extract the fluorescent template molecules from non-porous materials.

The rebinding of fluorescent templates to extracted molecularly imprinted polymers were evaluated. Small amounts of non-specific binding can effectively drowned out the signal from specific binding. This is a common problem with non-covalently imprinted polymer systems, caused by the required use of an excess of functional monomer. The layering of different polymers on top of each other presents a solution to this problem. By layering a thin inert polymer on top of the selective material we can prevent much of the non-specific binding that occurs mainly on the surface of the imprinted material. Additionally, the use of polymer bound fluorescent probes presents another option to lessen the effects of non-specific binding.

The use of SERS (surface enhanced Raman spectroscopy) as an alternative detection scheme for nano-MIPs was evaluated. Complications were encountered relating to the compatibility of the SERS particles with the polymer matrix. Recent reports in the literature have described this problem and presented a solution for bulk MIP systems, which involves functionalization of the surface of the SERS particle prior to polymerization. (See Matsui, J. et al.; Anal. Chem. 2004; 76, 1310-1315.)

Polymer Formulation

All monomers are distilled prior to use. All solvents are distilled and deoxygenated prior to use using nitrogen.

The molecular species to be imprinted is dissolved in the functional monomer methacrylic acid. The amount of template molecule and functional monomer used is dependent on the desired mole % required, typically 0.1-2 mol % for the template and 0.1-12 mol % functional monomer. In order to keep non-crosslinking monomer composition constant with varying functional monomer composition, a non-functional and non-crosslinking monomer such as ethoxyethyl methacrylate can be added. The resulting solution is used to dissolve the photoinitiator 4,4'-bis(dimethylamino)benzophenone to give an ultimate composition of 0.01-0.1 mol % initiator. This solution is agitated vigorously followed by the addition of the crosslinking monomer ethyleneglycoldimethacrylate to give a final composition containing 85 mol % crosslinking monomer. This mixture is then filtered through a 0.2 μm syringe filter. To this solution can be added a porogen solvent such as chloroform or acetonitrile to give porogen compositions ranging from 0 to 50% or higher.

Polymerization

The polymer formulation is introduced into a Teflon flow cell containing glass cover slips on top and bottom. Use of the flow cell allows for on-line changes of polymer formulation. This makes it possible to prepare arrays and complex polymer features containing polymers of varying composition. The flow cell is attached to a Piezo stage fitted to a Zeiss inverted fluorescence microscope. The 395 nm beam from a diode laser is coupled into the back of the microscope and focused to a diffraction limited spot at the interface of the interface of the bottom cover slip and the polymer formulation using a 100×oil immersion objective. Laser power settings are used to control the amount of polymer formed and can range from less than 10 μW to over 200 μW. Additionally, laser power can be kept constant and the scan rate can be adjusted to control the amount of polymer formed. Control of scan rate and size, shape and position of the polymer features are controlled using a Digital Instruments Nanoscope IIIA controller.

Formulation Example 1: TNT Imprinted Polymer with 50% Porogen 2,4,6-trinitrotolunene (2.6 mg) was dissolved in methacrylic acid (0.013 mL). To this solution was added 4,4'-bis (dimethylamino)benzophenone (1 mg). To this mixture was added ethylene glycol dimethacrylate (0.25 mL). The resulting mixture was agitated vigorously then filtered through a 0.2 μm syringe filter. The resulting solution was diluted with chloroform (0.25 mL). The monomer formulation was introduced into the flow cell, which had been fitted to a piezo stage atop an inverted microscope. The 395 nm beam from a diode laser was coupled into the back of the microscope and focused to a diffraction limited spot at the interface of the interface of the bottom cover slip and the polymer formulation using a 100×oil immersion objective. The laser power was measured at a point just before the laser inters the microscope as was adjusted to be 140 μW. Using a Nanoscope IIIA controller, the piezo stage was raster scanned to irradiate an area of 50 μm×50 μm with a scan rate of 1 Hz. Following the irradiation, the laser was turned off. The polymer formulation was flushed from the flow cell using chloroform followed by air leaving the fabricated polymer feature on the surface.

Optimization of Initiation System

Figure 5A:
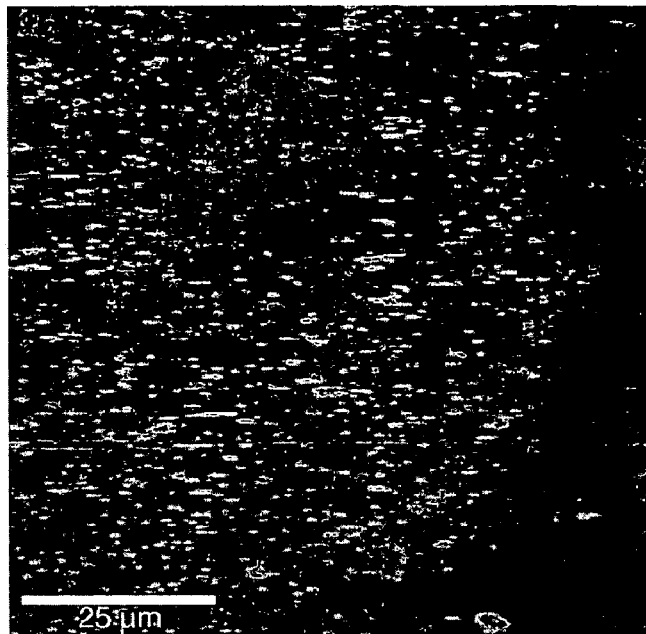
FIGS. 5a-5c are AFM images of polymer features.
Figure 5B:
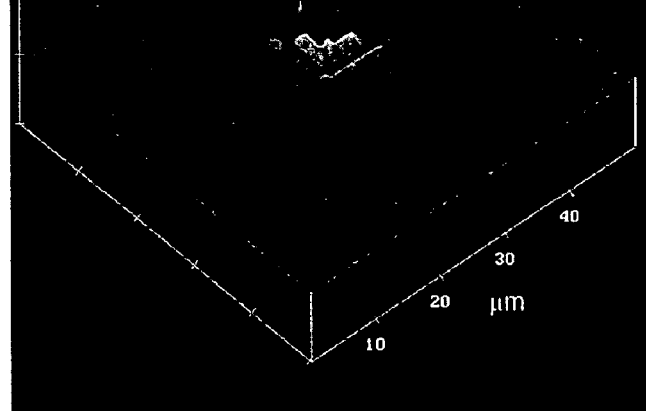
Figure 5C:
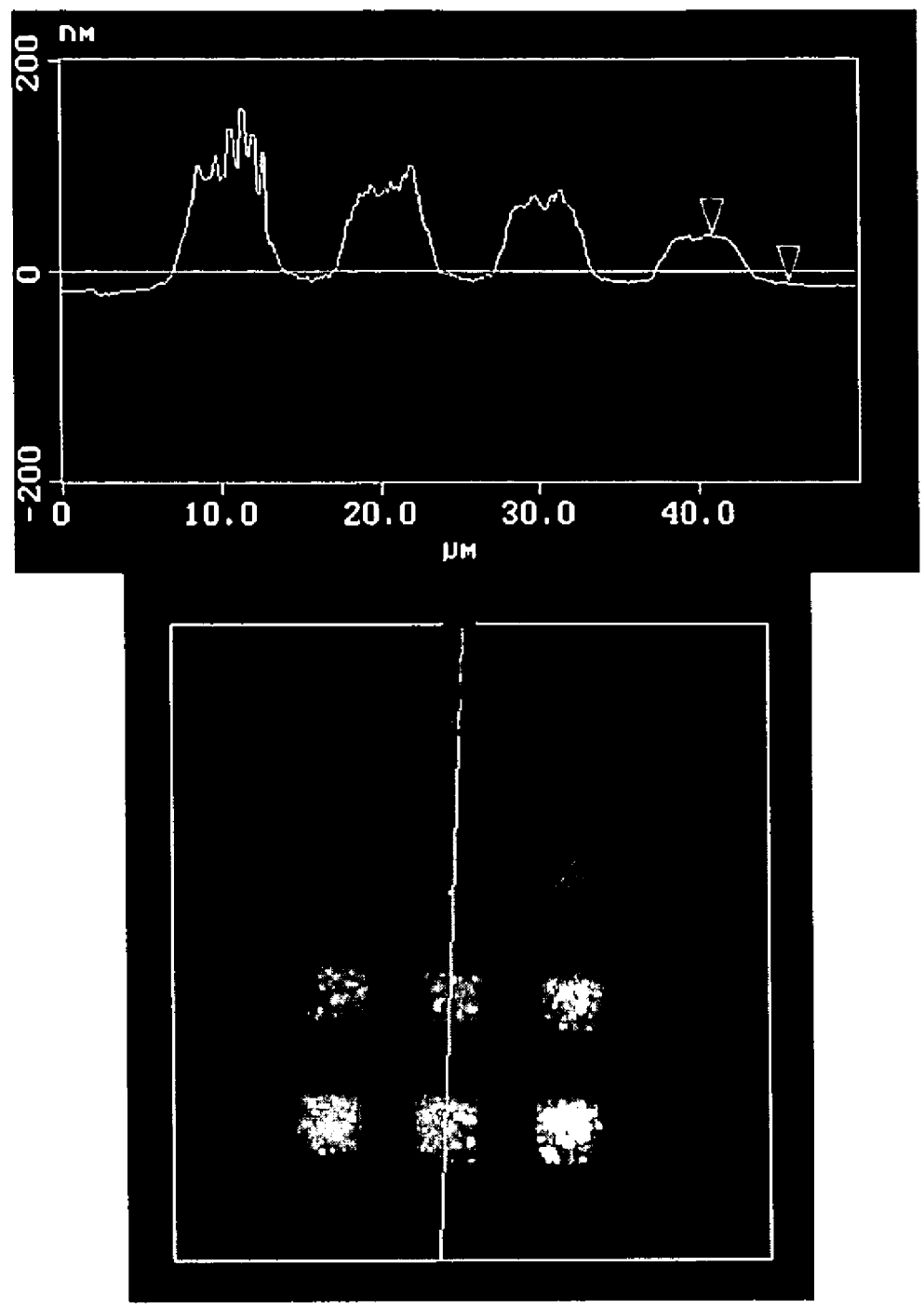
Figure 6:
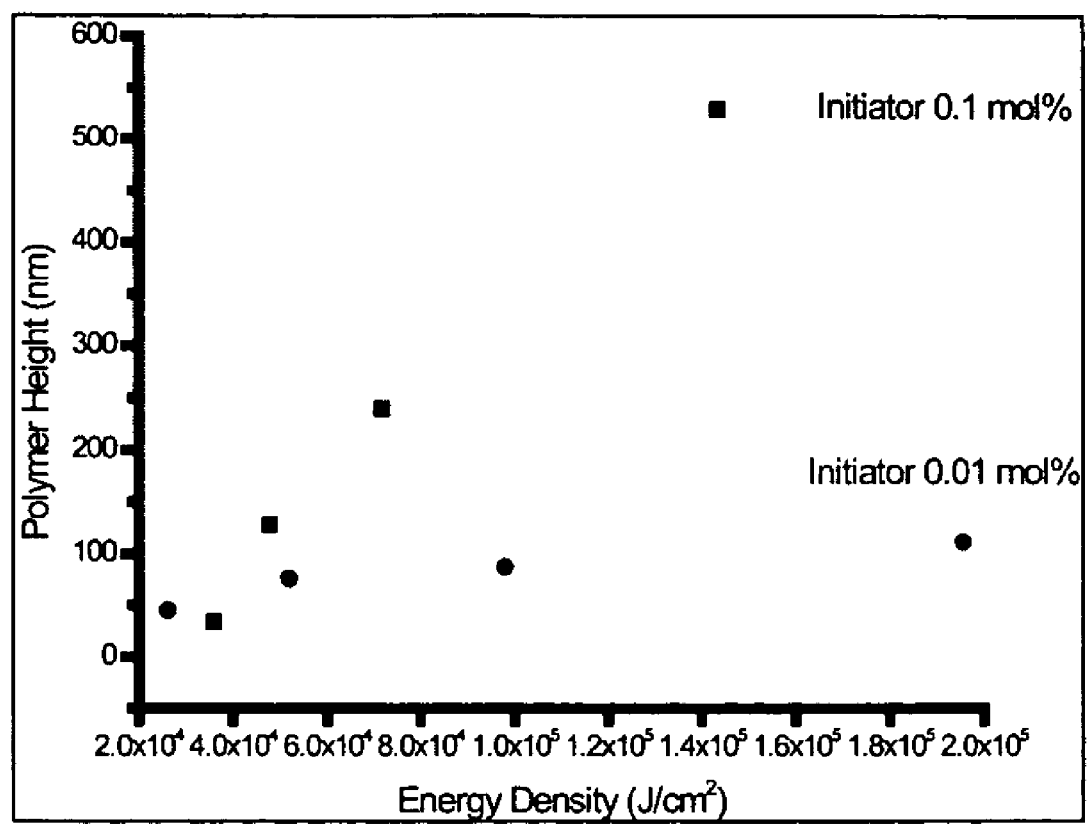
FIG. 6 shows a plot of polymer height as determined by AFM versus energy density ($J/\mu m^2$).
Figure 7:
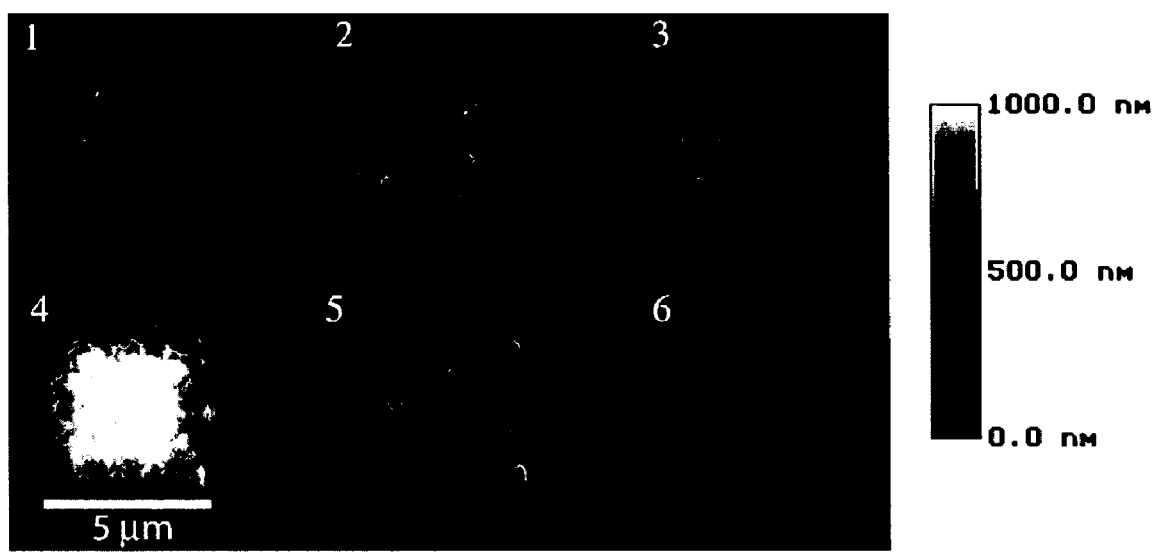
FIG. 7 shows a (TOP) AFM image of an MIP array prepared using varying laser powers and exposure times.

The optimum conditions for laser initiation has been determined. The relationship between laser power, irradiation time and feature size has been explored and a significant level of control can be exercised over feature shape and size. Photoinitiator concentrations have been optimized to allow efficient free radical generation while significantly reducing the "blooming" that occurred at the point of polymerization in early experiments. Features have been created that have a resolution in the directions orthogonal to the laser of approximately 500 nm while at the same time having vertical profiles ranging from approximately 10 nm to over 1 μm. Experiments were performed to determine the effects of photon flux on feature size. FIGS. 5a-5b show the following. FIG. 5a: AFM image of square polymer feature produced by laser initiation of EGDMA/MAA monomer mixture. This polymer was prepared using a formulation of 89 mol % EGDMA, 10.9 mol % MAA and 0.1 mol % initiator with a laser power of 140 μW and scan rate of 1 Hz.Polymer dimensions are 50 μm×50 μm×approximately 100 nm thick. FIG. 5b: AFF image of nested LLL produced by laser initiation of EGDMA/MAA monomer mixture discussed for FIG. 5a). Outer box is 30 μm and the three L's are 20 μm, 10 μm and 5 μm. Feature thickness varies from 8 nm for the outer box to 43 nm for the inner L. Line width is 1.8 μm. FIG. 5c:3×4 array of 5 μm polymer squares varying in height from 150 nm (left column) to 40 nm (right column). Also shown is a height profile obtained from the middle row. These polymers were prepared using a formulation of 89.9 mol % EGDMA, 10.09 mol % MAA and 0.01 mol % initiator with varying laser power to achieve increasing polymer heights. The Energy densities used for these polymers are given in the graph shown in FIG. 6. FIG. 6 shows a plot of polymer height as determined by AFM versus energy density ($J/\mu m^2$). The relationship between feature thickness and the photon energy density is linear until a region of low energy density ($<\sim 5.0\times 10^{-5}$ $J/\mu m^2$) is approached. The data shown in FIG. 6 was obtained by measuring the heights of the polymer features shown in FIG. 5c (0.01 mol % initiator) as well as for a similar array formed using 0.1 mol % initiator (image not shown). These polymers were prepared using a formulation of 89.9 mol % EGDMA, 10.0 mol % MAA and 0.1 mol %.

Preparation of nanoscale MIPs as arrays on a surface can enable detection of single or multiple target molecules. In their simplest form, these arrays comprise a single imprinted polymer designed to recognize a single analyte molecule. Detection can be accomplished either by extracting the bound molecules and identifying/quantifying them using tradition techniques such as GC or LC or by directly detecting binding events spectroscopically. In the extraction embodiment, the MIP acts as an advanced collector of the molecule of interest by specifically binding the target molecule in the presence of other molecular species. Incorporating a detection scheme utilizing spectroscopic techniques to directly interrogate the imprinted polymer eliminates the need for extraction and of-line analysis to determine presence and quantity of target molecules. In this embodiment, the imprinted polymer is acting as a sensor for the molecule of interest.

More complex systems, where arrays of nano-MIPs, each templated with a unique molecule of interest, will make it possible to detect the presence of multiple species simultaneously. These multi-element arrays of polymer features are prepared by repetitive application of the same technique used for the single element polymer features. This multiplexed approach can be combined with the simultaneous use of multiple detection techniques and is useful for identifying "fingerprints" of a particular health risk, for example.

MIP Structures for Separation/Catalysis

Because of their specific recognition abilities, MIPs can often be utilized as selective chromatographic stationary phases and catalysts. Laser initiation allows for nanoscale MIP features to be formed directly in channels of microfluidic devices for use in lab-on-a-chip applications.

Detection of Binding

A variety of detection techniques are available. Each of these techniques can be used to measure or detect the binding of analyte molecules to imprinted polymers. Depending on the type of polymer and analyte to be analyzed, particular techniques may have advantages of others for any given situation. In addition, it is possible to combine multiple techniques to enhance the sensitivity and/or selectivity of a particular MIP system. For example, an MIP can be used as a collector/concentrator and then followed by either (1) extraction of the MIP and standard analytical analysis or (2) direct analysis for MALDI or Laser Ablation type study. Additionally, an MIP can be coupled to spectroscopic detection of binding. Fluorescence spectrometry can be used to determine binding of polymer-bound and/or molecular-bound probes. Binding can also be detected by using both conventional Raman spectroscopy and/or surface-enhanced Raman spectroscopy (SERS)

Conventional Raman Spectroscopy

Raman spectroscopy probes the vibrational frequencies of molecular bonds. The bond vibrational frequencies are extremely sensitive to their local environment. Therefore, detecting a shift in the vibrational frequencies of selected polymer vibrational modes upon analyte binding is expected to be straightforward. Additionally, other spectroscopic features resulting from the presence of the analyte molecule in the probe volume can also be used to identify and quantify the presence of the analyte molecule. The significant increase in surface to volume ratio provided by nano-MIPs reduces the background arising from bulk polymer as well as fluorescence. Using the nano-MIPS, shifts in the vibrational frequencies of selected Raman modes upon analyte binding as well as the appearance of spectral features from the analyte are then used to quantify the analyte molecule.

Surface-Enhanced Raman Spectroscopy (SERS)

In addition to conventional Raman spectroscopy, significantly enhanced sensitivity can be obtained using Surface-Enhanced Raman Spectroscopy. SERS is a technique through which the Raman scattering signal is increased by several orders of magnitude. This significantly decreases the acquisition time required to attain a Raman spectra. There are several modes in which SERS can be coupled to MIPs: (1) Preparing the MIPs on a SERS substrate consisting of a roughened metal surface or a nanoparticle surface; (2) Incorporating SERS particles into the polymer matrix; and (3) Coating individual SERS particles with MIPs.

Additional Methods for Detection

In addition to the methods discussed above, several other methods can further expand the detection techniques available to nano-MIP based systems. These include: Coherent anti-stokes Raman spectroscopy (CARS), attenuated total internal reflectance, surface plasmon resonance, quartz crystal microbalance, cantilever sensing, differential swelling and surface acoustic wave (SAW) methods.

Template Selection and Binding Analysis

Fluorescent analytes have been used to facilitate the detection of binding. Several potential fluorescent template molecules have been identified and polymers have been prepared using some of these molecules. These templates include several naturally occurring amino acids, which have been chemically modified with a fluorescent Dansyl probe. In addition, templates containing other fluorescent probes such as Rhodamine are possible.

Successful synthesis of nanoscale polymers using common molecular imprinting formulations has been disclosed herein. In addition, the conditions required to prepare these materials in a controlled manner have been discussed. Large arrays of polymer features as well as complex patterns and structures can be prepared. Polymers with varying compositions can be prepared side by side on the same substrate using a flow cell. The preparation of MIP arrays made up of polymers, which are selective for a variety of molecular species can be achieved.

Throughout this application, various publications, patents, and published patent applications were referred to. The disclosures of the publications, patents, and published patent specifications referenced in this application are hereby incorporated by reference into the present disclosure to more fully describe the state of the art to which this invention pertains.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While various materials, parameters, operational sequences, etc. have been described to exemplify and teach the principles of this invention, such are not intended to be limited. Modifications and changes may become apparent to those skilled in the art; and it is intended that the invention be limited only by the scope of the appended claims.

The invention claimed is:

1. A method for forming a molecularly imprinted polymer, the method comprising:

providing a solid substrate in contact with a solution containing a plurality of polymerizable monomers including at least one type of functional monomer, a plurality of template molecules, and a plurality of photoinitiator molecules;

providing a controller in communication with a laser and an xy-piezo stage, wherein said xy-piezo stage is attached to an inverted microscope and wherein said laser emits a beam at a predetermined power that is coupled to the back of said inverted microscope;

positioning said solution on said xy-piezo stage;

controlling the position and scan rate of said xy-piezo stage with said controller; and focusing said laser beam through said microscope to irradiate said solution to form a first array layer on said solid substrate having a plurality of polymer features, wherein each feature has a predetermined size, shape, and position.

2. The method of claim 1, further comprising: layering onto said first array layer, a second array layer to form an array having a plurality of three dimensional polymer features.

3. The method of claim 2, further comprising: positioning an inert polymer between said first and said second array layers.

4. The method of claim 1, wherein said functional monomer includes methacrylic acid.

5. The method of claim 4, additionally including at least one type of non-functional monomer.

6. The method of claim 1, wherein the functional monomer ranges from 0.1-12 mol percent and the template molecule ranges from 0.1-2 mol percent.

7. The method of claim 1, wherein the amount of photoinitiator present ranges from 0.01-0.1 mol percent.

8. The method of claim 1, wherein said solution additionally includes a porogen solvent.

9. The method of claim 1, wherein the positioning of said solution on said piezo stage is accomplished by filling a flow cell with said solution and attaching said flow cell to said piezo.

10. The method of claim 1, wherein a power density of said laser beam ranges from 1 $mW/cm^2$ to 1 $MW/cm^2$ W.

11. The method of claim 1, wherein the wavelength of the laser beam ranges from 100 nm to 2000 nm.

12. The method of claim 1, wherein the positioning of said solution on said piezo stage is accomplished by using a glass cover slide, wherein said glass cover slide is attached to said piezo.

13. The method of claim 1, further comprising removing the template molecules from the first array layer.

* * * * *